(12) United States Patent
Jones et al.

(10) Patent No.: US 10,858,054 B2
(45) Date of Patent: Dec. 8, 2020

(54) MULTI-STAGE SHIFT PACK ASSEMBLY AND METHOD

(71) Applicant: Honda Motor Co., Ltd., Tokyo (JP)

(72) Inventors: David T. Jones, Lewis Center, OH (US); Jason B. Tingley, Fast Liberty, OH (US); Richard C. Barton, Marysville, OH (US); Samuel T. Bartlett, Jr., Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 170 days.

(21) Appl. No.: 15/884,675

(22) Filed: Jan. 31, 2018

(65) Prior Publication Data

US 2019/0233036 A1 Aug. 1, 2019

(51) Int. Cl.
| | | |
|---|---|---|
| *B62D 65/02* | (2006.01) | |
| *F15B 15/14* | (2006.01) | |
| *F15B 21/00* | (2006.01) | |
| *B23K 37/04* | (2006.01) | |

(52) U.S. Cl.
CPC ........ *B62D 65/022* (2013.01); *F15B 15/1404* (2013.01); *F15B 15/1409* (2013.01); *F15B 21/003* (2013.01); *B23K 37/04* (2013.01)

(58) Field of Classification Search
CPC .............. F15B 15/1404; F15B 15/1409; F15B 21/003; B23K 37/04; B62D 65/022
USPC .......................................... 254/89 R; 269/56
See application file for complete search history.

(56) References Cited

U.S. PATENT DOCUMENTS

| | | | | |
|---|---|---|---|---|
| 2,655,115 A | * | 10/1953 | Holdeman | B61K 5/00 |
| | | | | 104/32.1 |
| 4,924,996 A | * | 5/1990 | Svensson | B05B 15/62 |
| | | | | 198/341.05 |
| 6,378,843 B1 | * | 4/2002 | Hong | B66F 3/24 |
| | | | | 254/134 |
| 7,171,890 B2 | * | 2/2007 | Oudelaar | B66F 7/18 |
| | | | | 91/168 |
| 7,198,135 B2 | | 4/2007 | Naber | |
| 7,770,675 B2 | * | 8/2010 | Hayashi | B60K 6/46 |
| | | | | 180/65.265 |
| 7,770,868 B2 | * | 8/2010 | Koop | B66B 9/04 |
| | | | | 187/274 |
| 8,794,865 B2 | * | 8/2014 | Stadler | E01F 13/046 |
| | | | | 404/6 |
| 9,201,430 B2 | | 12/2015 | Crowell et al. | |
| 9,637,364 B2 | | 5/2017 | Nussbaum | |

(Continued)

FOREIGN PATENT DOCUMENTS

| | | |
|---|---|---|
| CN | 202389114 | 8/2012 |
| CN | 103343763 | 10/2013 |
| CN | 105880970 | 8/2016 |

(Continued)

*Primary Examiner* — Joseph J Hail
*Assistant Examiner* — Arman Milanian
(74) *Attorney, Agent, or Firm* — Rankin, Hill & Clark LLP

(57) ABSTRACT

A multi-stage shift pack assembly and method includes a frame assembly, a tool mounting movable relative to the frame assembly, and a removable cylinder shift pack secured to the frame assembly and having at least two cylinders that are independently actuatable for moving the tool mounting relative to the frame assembly a desired amount. The tool mounting is moved relative to the frame assembly by independently actuating cylinders of the removable cylinder shift pack.

19 Claims, 10 Drawing Sheets

(56) References Cited

U.S. PATENT DOCUMENTS

2004/0105340 A1\* 6/2004 Helder .................. B28C 5/4248
　　　　　　　　　　　　　　　　　　　　　　　366/68
2008/0038057 A1\* 2/2008 Stadler .................. E01F 13/046
　　　　　　　　　　　　　　　　　　　　　　　404/6

FOREIGN PATENT DOCUMENTS

| DE | 10222914 | 12/2003 |
| JP | 2010275067 | 12/2010 |
| KR | 100609844 | 7/2006 |
| KR | 20010094535 | 11/2011 |

\* cited by examiner

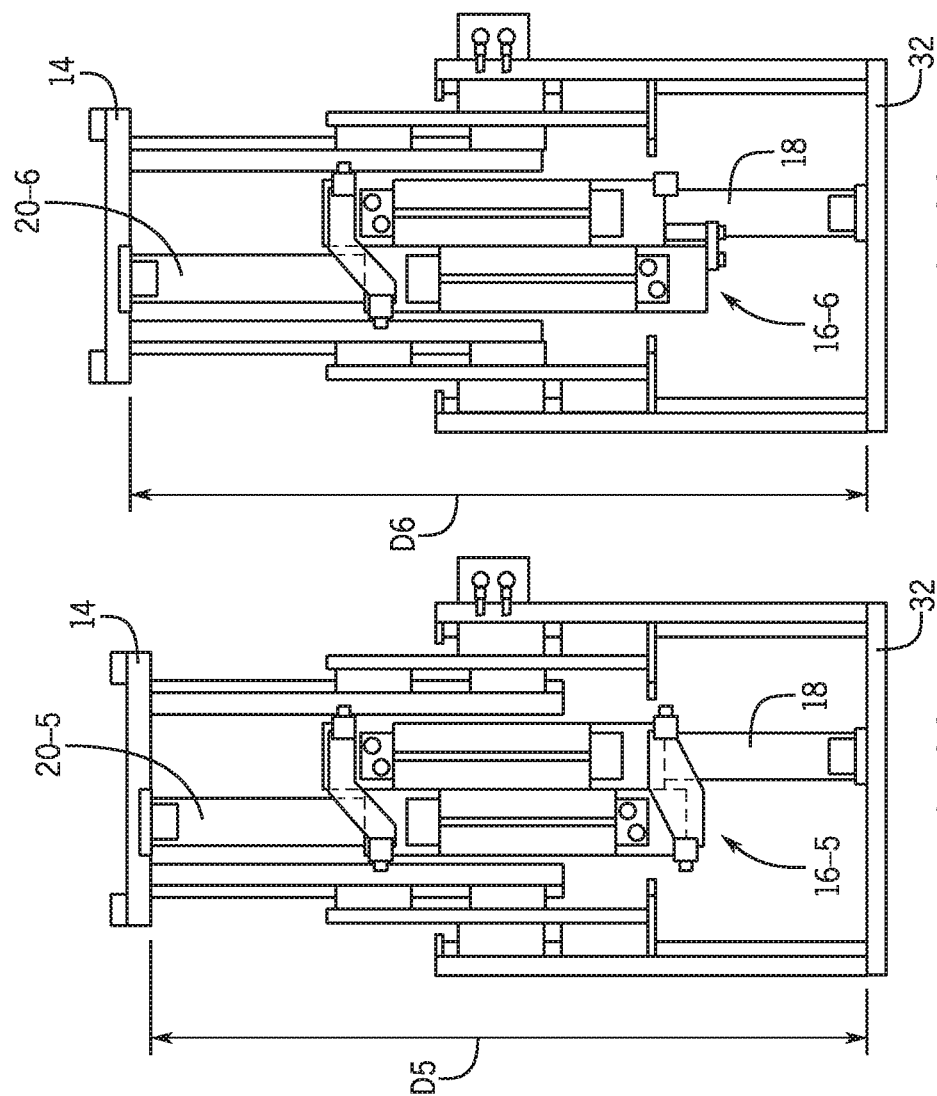

MULTI-STAGE SHIFT PACK ASSEMBLY AND METHOD

BACKGROUND

In vehicle assembly lines, transfer machines can be employed to carry a welded car body, in various states of completeness, the length of the welding assembly line with stops at each process stage. In particular, these transfer machines can carry the welded car body in a suspended state moving the welded car body along the welding assembly line to various stops. At each stop, supports can be provided for supporting the welded car body. In one example, toggle-type supports are provided at each stop. In particular, these are toggleable or movable between fully extended positions for supporting the welded car body and fully retracted positions for moving out of the way while the welded car body is transferred to the next process stage. In one example, the supports each include a pneumatic cylinder and are positioned in pairs with one support at the front of the car body and one support at the rear of the car body. This set up is limited when multiple car models are assembled along the welding assembly line as limited stroke is provided between the fully extended and fully retracted positions.

BRIEF DESCRIPTION

According to one aspect, a multi-stage shift pack assembly includes a frame assembly, a tool mounting movable relative to the frame assembly, and a removable cylinder shift pack secured to the frame assembly and having at least two cylinders that are independently actuatable for moving the tool mounting relative to the frame assembly a desired amount.

According to another aspect, a shift pack assembly for adjustably supporting a vehicle frame includes a frame assembly with a tool mounting movably supported thereby, a first cylinder, and a second cylinder. The first cylinder has a first cylinder housing secured to the frame assembly and a first cylinder rod. The first cylinder is arranged such that the first cylinder rod extends downwardly relative to the first cylinder housing upon actuation thereof to raise the tool mounting. The second cylinder has a second cylinder housing secured to the frame assembly and a second cylinder rod. The second cylinder is arranged such that the second cylinder rod extends upwardly relative to said second cylinder housing upon actuation thereof to raise the tool mounting. The first and second cylinders are independently actuatable relative to one another such that the tool mounting is movable a first cylinder stroke distance upon actuation of the first cylinder and/or is movable a second cylinder stroke distance upon actuation of the second cylinder.

According to a further aspect, a multi-stage shift pack method is provided for adjustably supporting a vehicle frame. In the method, a frame assembly, a tool mounting movable relative to the frame assembly, and a removable cylinder shift pack secured to the frame assembly are provided. The tool mounting is moved relative to the frame assembly by independently actuating cylinders of the removable cylinder shift pack.

BRIEF DESCRIPTION OF THE DRAWINGS

FIGS. 9-13 are front elevation views of multi-stage shift pack assemblies having varying slave cylinders installed therein according to alternate exemplary embodiments.

DETAILED DESCRIPTION

Figure 1:
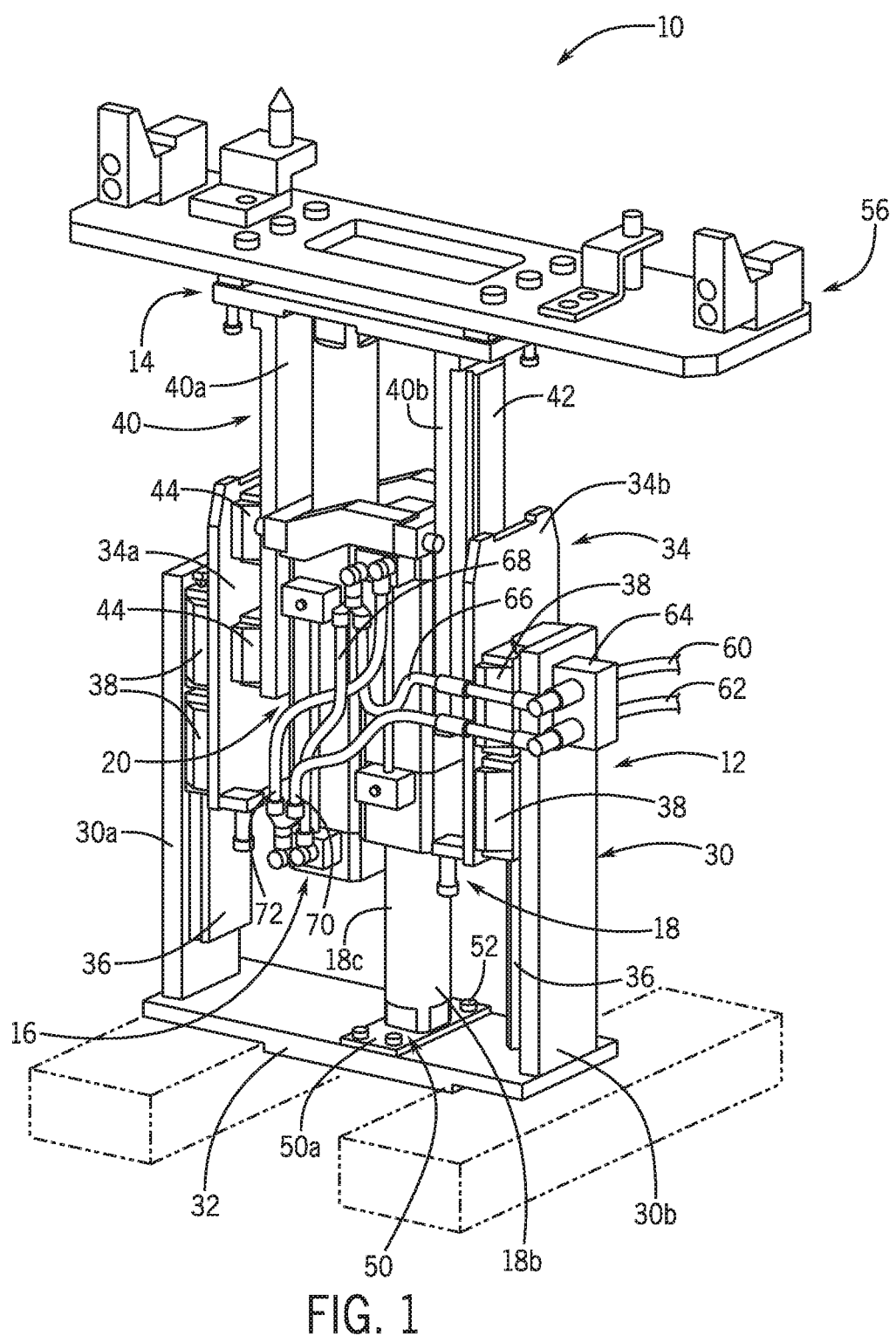
FIG. 1 is a perspective view of a multi-stage shift pack assembly for adjustably supporting a vehicle frame according to an exemplary embodiment, the shift pack assembly having a cylinder shift pack including a first or master cylinder and a second or slave cylinder.
Figure 2:
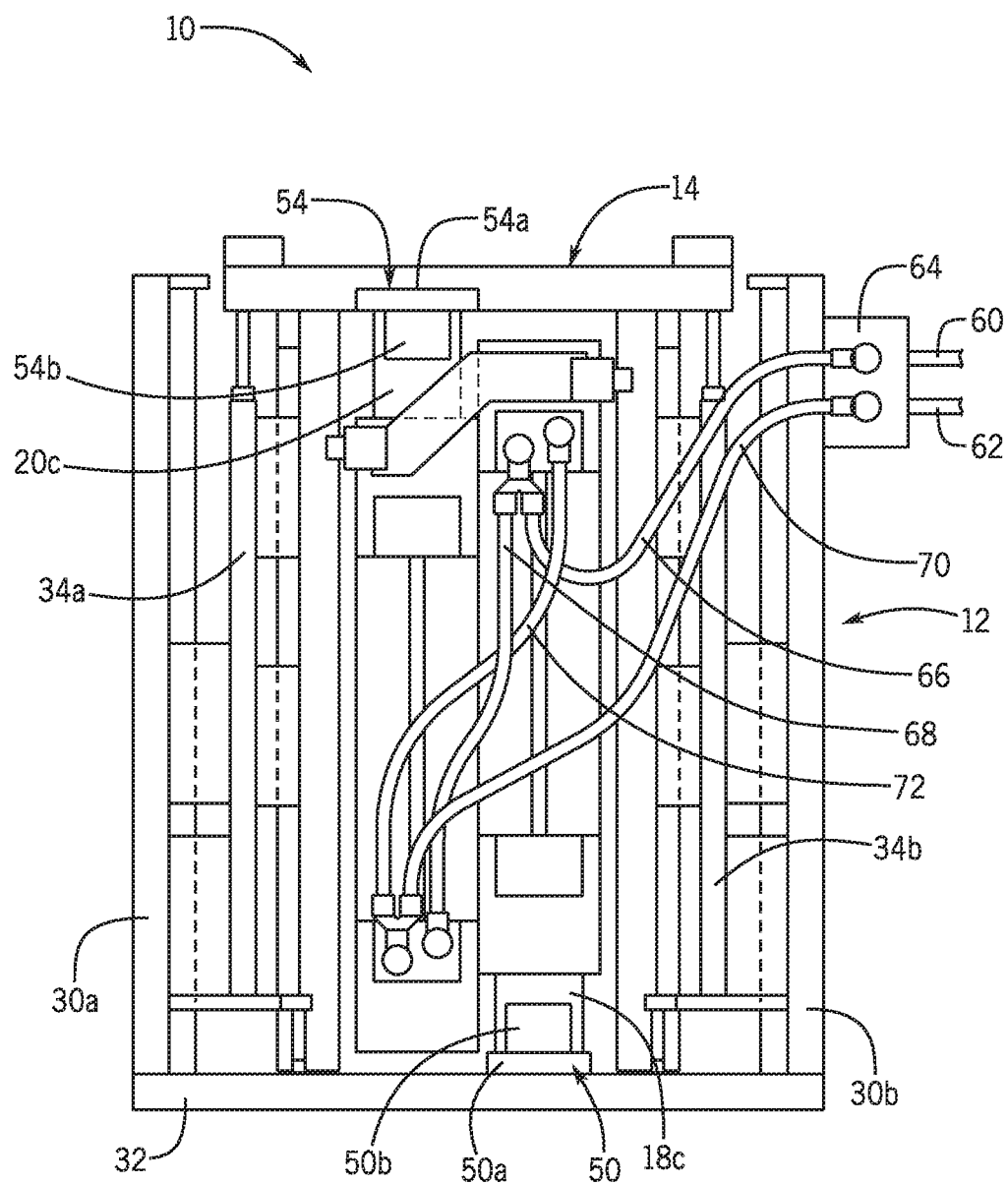
FIG. 2 is a front elevation view of the shift pack assembly of FIG. 1 with both a slave cylinder and a master cylinder of the cylinder shift pack shown in fully retracted positions.
Figure 3:
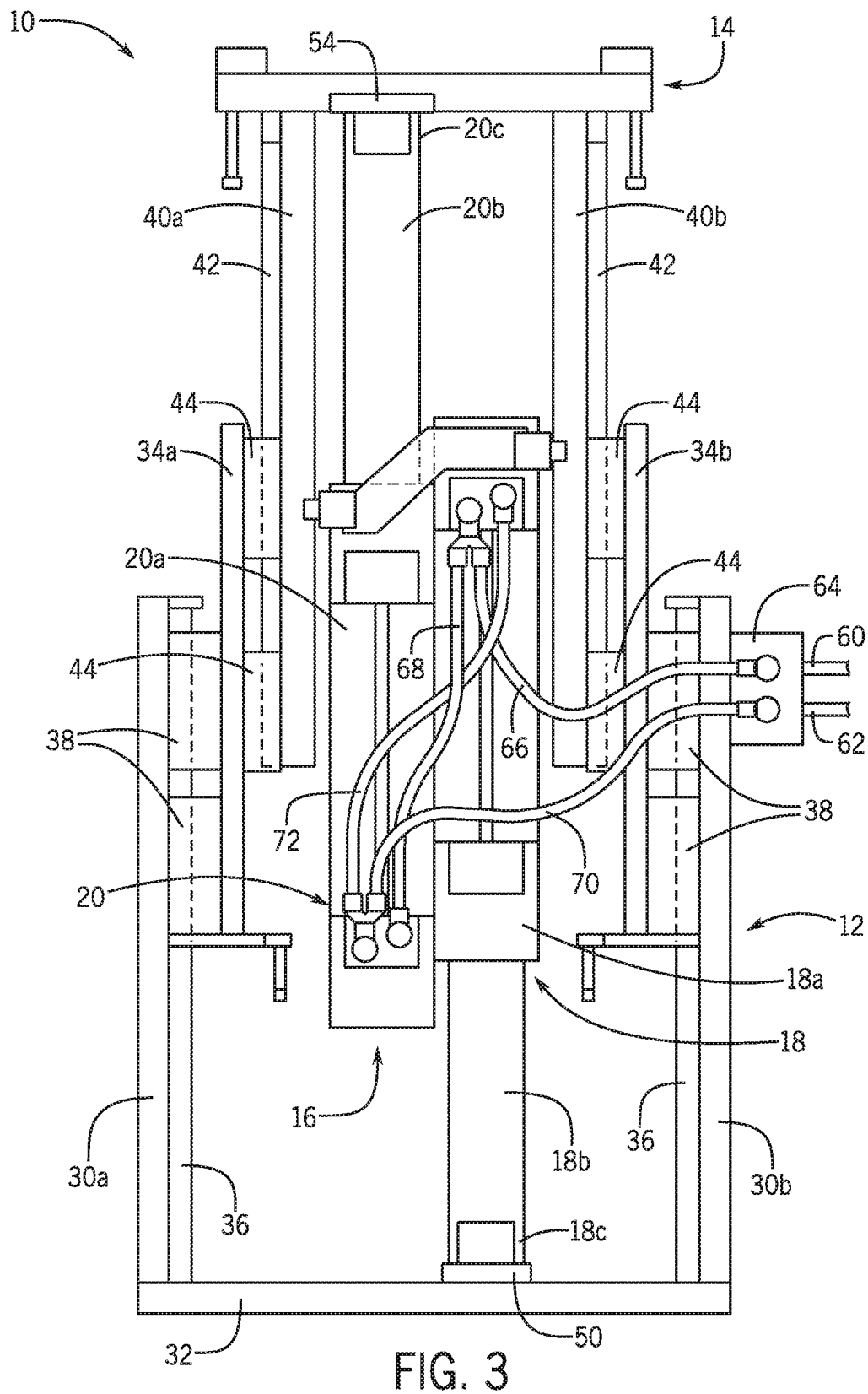
FIG. 3 is a front elevational view similar to FIGS. 2 and 3 but showing both the slave cylinder and the master cylinder in fully extended positions.

Referring now to the drawings wherein the showings are for purposes of illustrating one or more exemplary embodiments and not for purposes of limiting the same, FIGS. 1-3 show a multi-stage shift pack assembly 10 according to one exemplary embodiment for adjustably supporting a vehicle frame (not shown). The shift pack assembly 10 of the embodiment illustrated in FIG. 1 includes a frame assembly 12 and a tool mounting 14 movable relative to the frame assembly 12. The shift pack assembly 10 further includes a removable cylinder shift pack 16 secured to the frame assembly 12 and having at least two cylinders (e.g., first cylinder 18 and second cylinder 20) that are actuatable for moving the tool mounting 14 relative to the frame assembly 12 a desired amount. In the embodiment illustrated in FIG. 1, the at least two cylinders are actuatable as a set (i.e., both cylinders 18, 20 are together movable to respective extended positions and retracted positions). However, in alternate embodiments (e.g., FIG. 4A), the at least two cylinders are independently actuatable of one another (i.e., the first cylinder 18 is separately actuatable relative to the second cylinder 20, the second cylinder 20 is separately actuatable relative to the first cylinder 18, both cylinders 18, can be together actuated for movement to full extended positions or full retracted positions).

As will be described in more detail below, in the various illustrated embodiments, the at least two cylinders can include first cylinder 18 arranged to extend in a first direction (downward in FIG. 1) away from the tool mounting 14 upon actuation of the first cylinder 18 to its fully extended position and second cylinder 20 arranged to extend in a second direction (upward in FIG. 1) toward the tool mounting 14 upon actuation of the second cylinder 20 to its fully extended position. Hereinbelow, the first cylinder 18 can also be referred to as the master cylinder 18 and the second cylinder 20 can be referred to as the slave cylinder 20. The first and second cylinders 18, 20 can also be actuated in reverse (i.e., to fully retracted positions). As will be described in more detail, actuation of the first cylinder 18 can move the first and second cylinder housings upward to move the tool mounting 14 upward.

More particularly, the first cylinder 18 has a first cylinder housing 18*a* secured to the frame assembly 12 and a first cylinder rod 18*b* slidably connected to the first cylinder housing 18*a* and extendable from the first cylinder housing 18*a* in a direction away from the tool mounting 14. The first cylinder 18 is particularly arranged such that the first cylinder rod 18*b* extends downwardly relative to the first cylinder housing 18*a* upon actuation thereof to a fully extended position to raise the tool mounting 14 upwardly. When so moved, the first cylinder rod 18*b* extends a first cylinder stroke distance and the tool mounting moves upward a distance corresponding to the first cylinder stroke distance.

Likewise, the second cylinder 20 has a second cylinder housing 20*a* secured to the frame assembly 12 and a second cylinder rod 20*b* movably connected to the second cylinder housing 20*a* and extendable from the second cylinder housing 20*a* in a direction toward the tool mounting 14. As shown, the first cylinder housing 18*a* can be non-movable secured to the second cylinder housing 20*a*. The second cylinder 20 is arranged such that the second cylinder rod 20*b* extends upwardly relative to the second cylinder housing 20*a* upon actuation thereof to the fully extended position to raise the tool mounting 14. When so moved, the second cylinder rod 20*b* extends a second cylinder stroke distance and the tool mounting 14 moves upward a distance corresponding to the second cylinder stroke distance. Upon actuation to fully retracted positions, the first and second cylinder rods 18*b*, 20*b* are retractable into their respective cylinder housings 18*a*, 20*a* and the tool mounting 14 lowers an amount corresponding to the first and second cylinder stroke distances.

Figure 4:
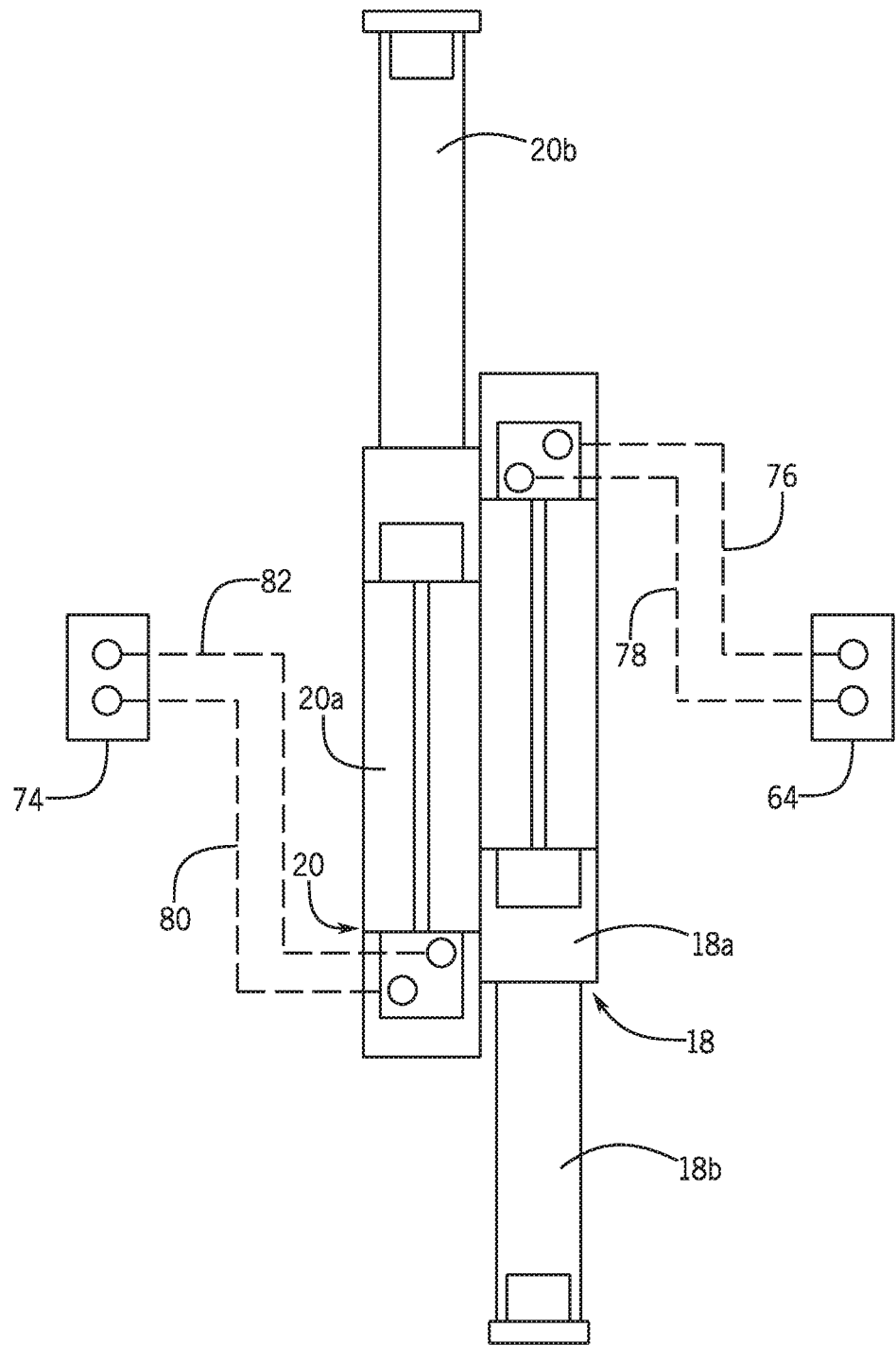
FIG. 4 is a schematic diagram schematically showing the master cylinder and the slave cylinder fluidly connected to separate manifolds according to an alternate exemplary embodiment.
Figure 5:
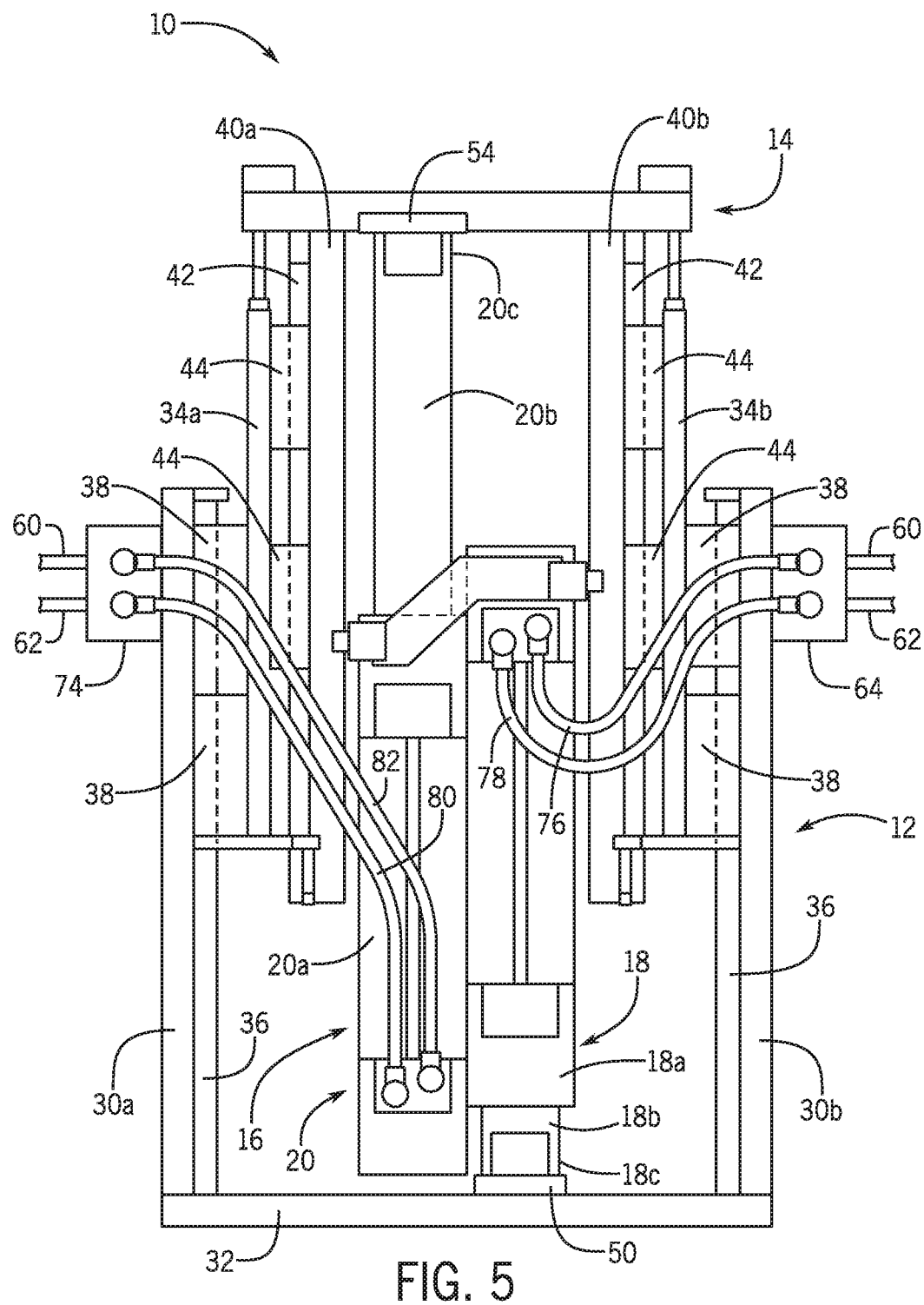
FIG. 5 is a front elevational view similar to FIGS. 2-3 but showing only the slave cylinder of the cylinder shift pack in an extended position (and showing the cylinders fluidly connected to a second manifold for independent actuation of the cylinders).
Figure 6:
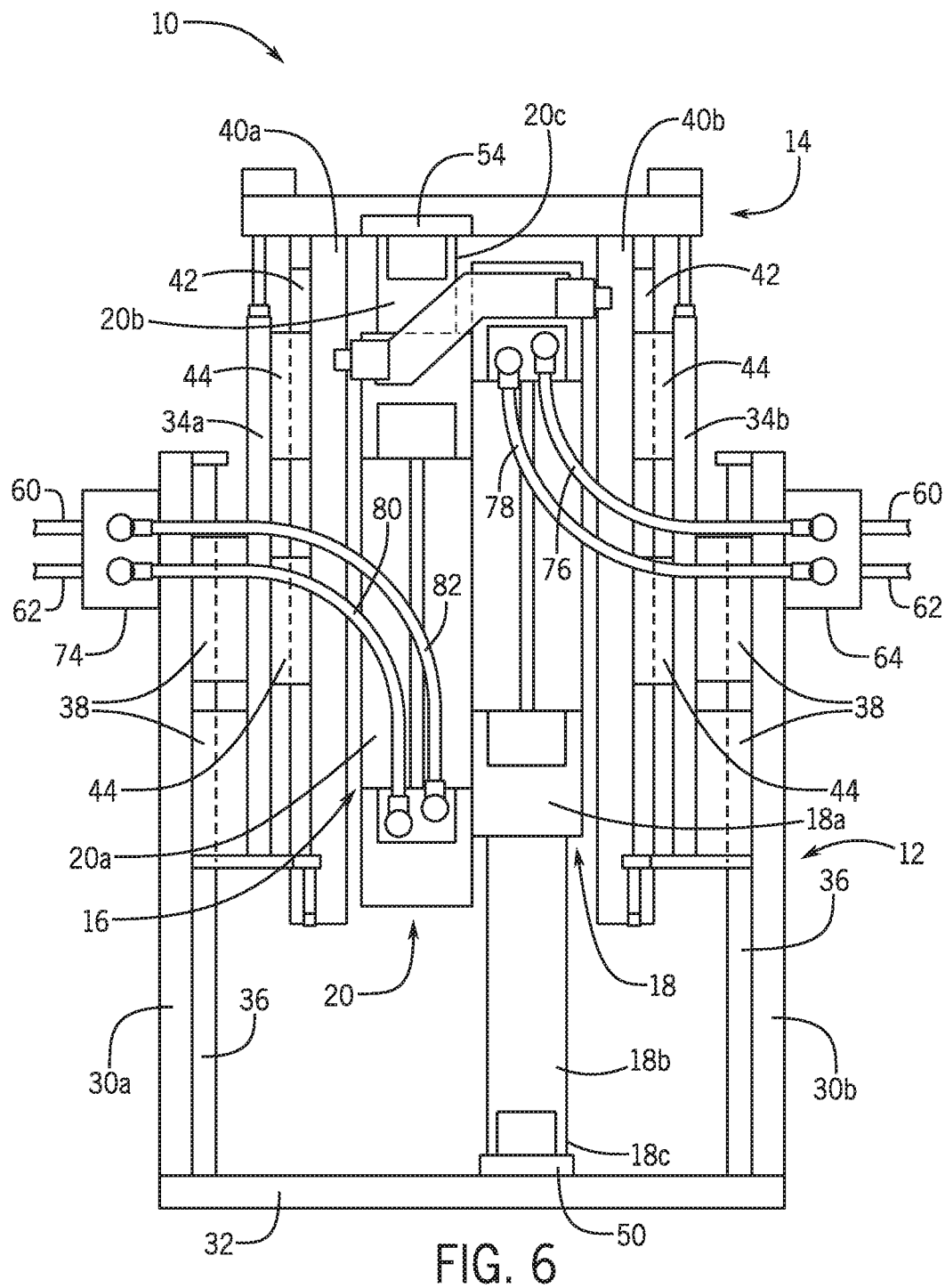
FIG. 6 is a front elevational view similar to FIG. 6 but showing only the master cylinder of the cylinder shift pack in an extended position.

Optionally, and with brief reference to FIGS. 4-6 and the alternate fluid connections for the first and second cylinders 18, 20 shown therein, the first and second cylinders 18, 20 can be independently actuatable relative to one another such that the tool mounting 14 is movable the distance corresponding to the first cylinder stroke distance upon actuation of the first cylinder 18 to its fully extended position and/or is movable the distance corresponding to the second cylinder stroke distance upon actuation of the second cylinder 20 to its fully extended position. More specifically, when the cylinders 18, 20 are configured for independent actuating movement, the tool mounting 14 can move: (i) only a distance corresponding to the first cylinder stroke distance only if only the first cylinder 18 is actuated (FIG. 6), (ii) only a distance corresponding to the second cylinder stroke distance if only the second cylinder 20 is actuated (FIG. 5), and (iii) the combined distances corresponding to both the first cylinder stroke distance and the second cylinder stroke distance when both the first and cylinders 18, 20 are together actuated (similar to FIG. 3).

In the illustrated embodiment, the frame assembly 12 includes a lower frame assembly 30 comprised of lower frame members 30*a*, 30*b* both extending upwardly and spaced apart laterally relative to one another. In the illustrated embodiment, the lower frame members 30*a*, 30*b* can be secured to and extend upward from a base member 32, though this is not required. The frame assembly 12 can further include a middle frame assembly 34 slidably secured to the lower frame assembly 30 for slidable movement in a vertical direction relative thereto. In particular, the middle frame assembly can include middle frame members 34*a*, 34*b* spaced apart from one another and connected, respectively, to the lower frame members 30*a*, 30*b*. In the illustrated embodiment, guiderails 36 can be disposed on the lower frame members 30*a*, 30*b* and bearing slides 38 can be fixably secured to the middle frame members 34*a*, 34*b* for slidably connecting the middle frame assembly 34 to the lower frame assembly 30.

Additionally, the frame assembly 12 can further include an upper frame assembly 40 slidably secured to the middle frame assembly 34 for slidable movement in the vertical direction relative thereto. As shown, the tool mounting 14 can be fixably secured to a distal upper end of the upper frame assembly 40. In particular, the upper frame assembly 40 can include upper frame members 40*a*, 40*b* spaced apart laterally from one another and slidably secured, respectively, to the middle frame members 34*a*, 34*b*. In particular, guiderails 42 can be secure to each of the upper frame members 40*a*, 40*b* and bearing slides 44 can be secured to the middle frame members 34*a*, 34*b* for slidably connecting the upper frame assembly 40 to the middle frame assembly 34.

In particular, in the illustrated embodiment, the first cylinder 18 is arranged to move the middle frame assembly 34 relative to the lower frame assembly 30 upon actuation of the first cylinder 18 to its fully extended position and thereby move the tool mounting 14 relative to the lower frame assembly 30 and the base member 32 a first cylinder distance corresponding to the first cylinder. The second cylinder 20 is arranged to move the upper frame assembly 40 relative to the middle frame assembly 34 upon actuation of the second cylinder 20 to its fully extended positon and thereby move the tool mounting 14 relative to the middle frame assembly 34, and thereby relative to the lower frame assembly 30 and the base member 32, a second cylinder distance corresponding to the second cylinder 20.

The base member 32 of the frame assembly 12 can have a distal end 18*c* of the first cylinder rod 18*b* of the first cylinder 18 attached thereto for abutment thereagainst. In the illustrated embodiment, a mounting collar 50 secures the distal end 18*c* of the cylinder rod 18*b* of the first cylinder 18 to the base member 32. In particular, in the illustrated embodiment, the mounting collar 50 can include base plate 50*a* secured to the base member 32 such as via fasteners 52 (e.g., threaded members or bolts) and upstanding flanges 50*b* extending upward from the base plate 50*a* to capture the distal end 18*c* of the first cylinder rod 18*b*. Similarly, a distal end 20*c* of the second cylinder rod 20*b* of the second cylinder 20 can be attached to the tool mounting 14 for abutment thereagainst. In particular, a mounting collar 54 can secure the distal end 20*c* of the second cylinder rod 20*b* to the tool mounting 14. Like the mounting collar 50, the mounting collar 54 can include a base plate 54*a* secured to the tool mounting 14 via fasteners 52 and can include flanges 50*b* for securing or capturing the distal end 20*c* of the second cylinder rod 20*b*.

As shown in FIG. 1, a mounting fixture 56 can be secured to the tool mounting 14 that is specifically configured for cooperative engagement with a vehicle frame (not shown) that is to be supported by the shift pack assembly 10. As should be understood by those skilled in the art, the mounting fixture 56 can be adapted or substituted for depending on the particular vehicle frame that is to be supported by the shift pack assembly 10.

FIG. 2 illustrates the shift pack assembly 10 with the first and second cylinders 18, 20 both in their respective retracted states wherein the first and second cylinder rods 18*b*, 20*b* are both in their respective fully retracted positions within the first and second cylinder housings 18*a*, 20*a*. FIG. 3 illustrates the shift pack assembly 10 with both the first and second cylinders 18, 20 in their fully extended states. That is, FIG. 3 illustrates the first cylinder 18 in its fully extended state wherein the first cylinder rod 18*b* is fully extended relative to the first cylinder housing 18*a*. Likewise, the second cylinder 20 is illustrated in its fully extended state wherein the second cylinder rod 20*b* is fully extended relative to the second cylinder housing 20*a*. This provides the maximum stroke distance for the tool mounting 14. That is, the tool mounting 14 is moved a combined distance corresponding to both the first and second cylinders 18, 20.

In the embodiment illustrated in FIGS. 1-3, the cylinders 18, 20 are together actuatable wherein both cylinder rods 18*b*, 20*b* are extended from their respective cylinder housing 18*a*, 20*a* so that the tool mounting 14 is moved upwardly a distance corresponding to the combined stroke distances of the first and second cylinders 18, 20. In one embodiment, each of the cylinders 18, 20 can be a pneumatic cylinder. In a more specific embodiment, each of the cylinders 18, 20 can be a double acting cylinder. By way of example only, each of the cylinders 18, 20 can be a double power cylinder wherein pressurized air from an air source (now shown) can be provided to extend the cylinder rods 18*b*, 20*b* from their respective cylinder housings 18*a*, 20*a* and can be supplied to retract the cylinder rods 18*b*, 20*b* into their respective housing 18*a*, 20*a*. Also, in this or another embodiment, the cylinders 18, 20 are locking cylinders wherein, once the cylinder rods 18*b*, 20*b* are fully extended, the cylinder rods 18*b*, 20*b* are locked so air leakage does not result in the cylinder rods 18*b*, 20*b* partially retracting. Likewise, when the cylinders are in the fully retracted states, the cylinder rods 18*b*, 20*b* are locked.

In particular, in the illustrated embodiment, air inlets 60, 62 can be provided on manifold 64. Air inlet 60 can be fluidly connected to the cylinders 18, 20 via lines 66 and 68 whereby pressurized air delivered to the cylinders 18, 20 via the lines 66, 68 can cause the cylinder rods 18*b*, 20*b* to extend from the cylinder housings 18*a*, 20*a* to their fully extended positions as is known by those skilled in the art. Once fully extended, the cylinder rods 18*b*, 20*b* are locked until pressurized air is provided to an opposite piston side of the cylinders 18, 20 via air inlet 62. Air inlet 62 can be fluidly connected to the cylinders 18, 20 via lines 70, 72. Pressurized air delivered from air inlet 62 to the cylinders 18, 20 via the lines 70, 72 can cause the cylinder rods 18*b*, 20*b* to retract into the cylinder housings 18*a*, 20*a* as is also known in the art. Once fully retracted, the cylinder rods 18*b*, 20*b* are locked until pressurized air is provided to the cylinders 18, 20 again via air inlet 60 and lines 66, 68.

With further reference to FIGS. 4-6, the cylinders 18 and 20 in an alternate embodiment can be respectively fluidly connected to manifolds 64 and 74. When two manifolds are used as shown in FIGS. 4-6, independent operation of the cylinders 18, 20 can be achieved. In particular, the manifold 64 can be fluidly connected to only the cylinder 20 via lines 76, 78, and the manifold 74 can be fluidly connected to only the cylinder 18 via lines 80, 82. In this arrangement, pressurized air can be selectively provided to each of the cylinders 18, 20 to independently extend the respective cylinder rods 18*b*, 20*b* or retract the respective cylinder rods 18*b*, 20*b*.

FIG. 5 illustrates the shift pack assembly 10 wherein only the second cylinder 20 is actuated to its fully extended position and the first cylinder 18 remains in its fully retracted position. That is, FIG. 5 illustrates the second cylinder 20 having the second cylinder rod 20*b* in its fully extending position relative to the second cylinder housing 20*a* wherein the second cylinder rod 20*b* moves the tool mounting 14 upwardly a second cylinder stroke distance corresponding to the second cylinder 20. FIG. 6 illustrates the shift pack assembly 10 wherein only the first cylinder 18 is actuated to its fully extended position and the second cylinder 20 remains in its fully retracted position. That is, FIG. 6 illustrates the first cylinder 18 having the first cylinder rod 18*b* in its fully extended position relative to the first cylinder housing 18*a* wherein the first cylinder rod 18*b* moves the tool mounting 14 upwardly a first cylinder stroke distance corresponding to the first cylinder 18.

Figure 7:
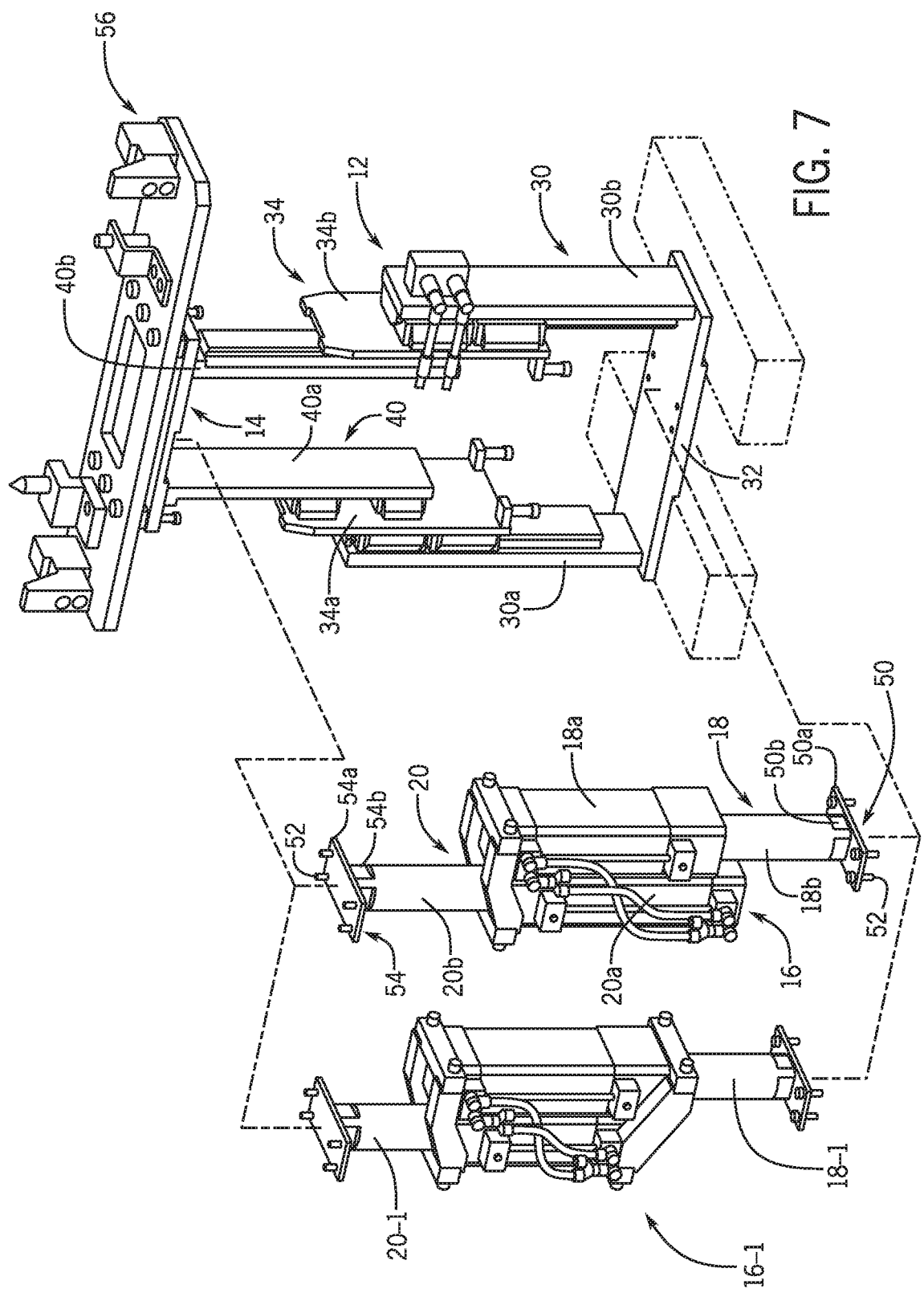
FIG. 7 is a perspective view of the shift pack assembly of FIG. 1 but shown with the cylinder shift pack removed from a frame assembly of the shift pack assembly and being replaced by a substitute cylinder shift pack.

Conveniently and advantageously, the cylinder shift pack 16 is removable from the frame assembly 12 such as when desired to substitute an entire cylinder shift pack for the cylinder shift pack 16 or to replace/substitute one or both of the cylinders 18 or 20 in the cylinder shift pack 16. This can occur when desired to provide the shift pack assembly 10 with a different set of stroke lengths. More particularly, in one example and with reference to FIG. 7, the cylinder shift pack 16 is shown removed from the frame assembly 12 for replacement in the shift pack assembly 10 by a substitute cylinder shift pack 16-1 having substitute cylinders 18-1 and 20-1. In one embodiment, the substitute first cylinder 18-1 can have the same stroke length as the first cylinder 18 and only the substitute second cylinder 20-1 has a different stroke length than the second cylinder 20 of the cylinder shift pack 16. In other embodiments, not shown, only the first substitute cylinder 18-1 has a different stroke length than the first cylinder 18 or both the substitute cylinders 18-1 and 20-1 can have differing stroke lengths relative to the first and second cylinders 18-20.

In these or further embodiments, the entire cylinder shift pack 16 is removed from the frame assembly 12 and substituted for the substitute cylinder shift pack 16-1. To remove the cylinder shift pack 16, the fasteners 52 are disengaged or unthreaded so that the mounting collars 50, 54 are detached respectively from the base member 32 and the tool mounting 14. Advantageously, this allows the same frame assembly 12 to be used.

Figure 8:
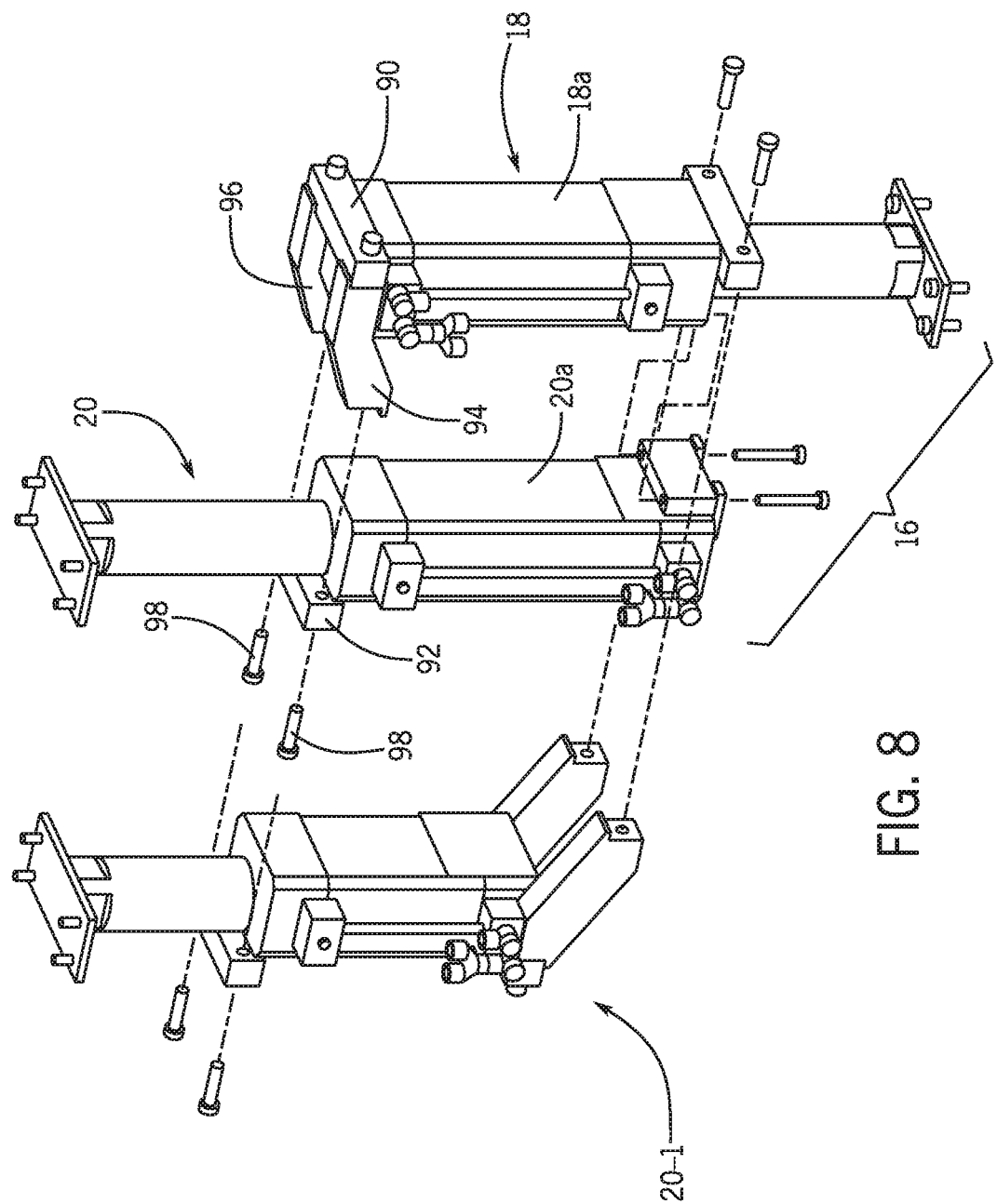
FIG. 8 is a perspective view of the cylinder shift pack removed from the frame assembly and shown with the slave cylinder disconnected from the master cylinder for replacement by a substitute slave cylinder.
Figure 11:
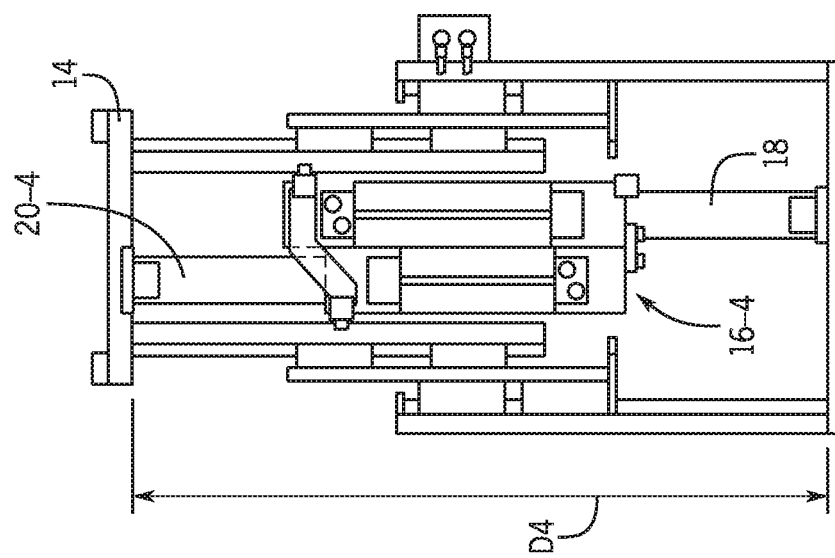
Figure 10:
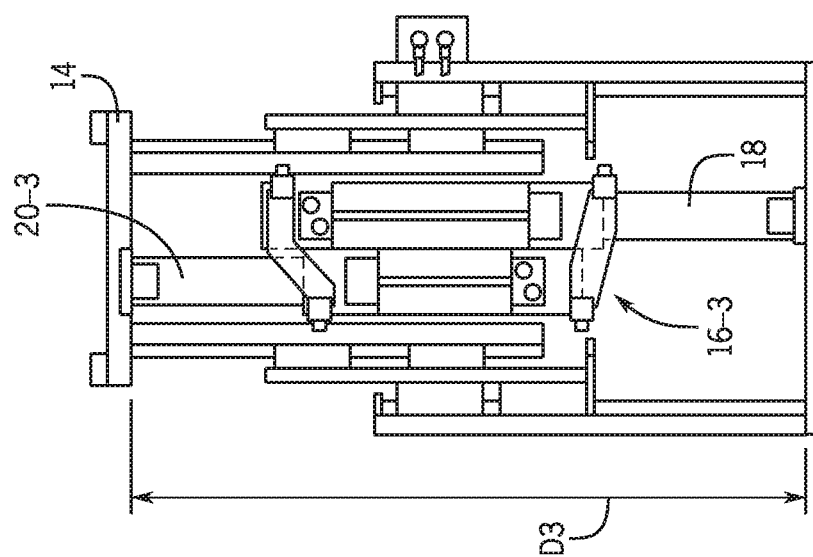
Figure 9:
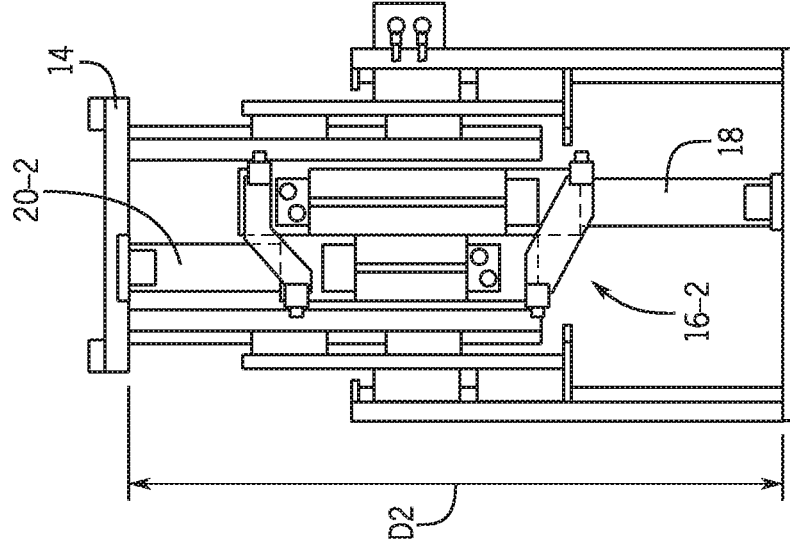

With additional reference to FIG. 8, the cylinder shift pack 16 is shown in a disassembled state wherein the second cylinder 20 is shown detached from the first cylinder 18. As shown, brackets 90, 92 are secured together with arm members 94, 96 interposed therebetween. In particular, fasteners 98 removably secure the brackets 90, 92 to the arm members 94, 96 thereby securing the first and second cylinder housings 18*b*, 20*b* together at adjacent ends thereof. Likewise, mounting members 100, 102 are secured together via fasteners 104 so as to removably further connect first and second cylinder housings 18*a*, 20*a* together at opposite adjacent ends thereof. In one embodiment, after the cylinder shift pack 16 is removed from the frame assembly 12, the second cylinder 20 can be substituted for by the substitute second cylinder 20-1 as shown in FIG. 8 so that only the second cylinder is replaced and the second cylinder stroke length now corresponds to the substitute second cylinder 20-1. Thus, the second cylinder 18 is removable and replaceable with the substitute second cylinder 20-1 for varying the second cylinder stroke distance. Though not shown, it is also contemplated that the first cylinder 18 could be substituted and the second cylinder 20 kept when the cylinder shift pack 16 is reinstalled in the frame assembly 12.

A multi-stage shift pack method for adjustably supporting a vehicle frame will now be described. In particular, the method will be described in reference to the multi-stage shift pack assembly 10 described hereinabove, though it is to be appreciated that the method could be used with other shift-pack assemblies. In the method, a frame assembly, a tool mounting 14 movable relative to the frame assembly 12 and a removable cylinder shift pack 16 secured to the frame assembly 12 are provided. As already described herein, the tool mounting 14 can be moved relative to the frame assembly 12 by actuating the cylinders 18, 20 of the removable cylinder shift pack 16. Optionally, the cylinders 18, 20 can be actuated independently of one another as described herein. In particular, moving of the tool mounting 14 relative to the frame assembly 12 can include independently actuating the first cylinder 18 of the removable cylinder shift pack 16, wherein cylinder rod 18b of the first cylinder moves downward in a direction away from the tool mounting 14. Also, moving of the tool mounting 14 relative to the frame assembly 12 can include independently actuating the second cylinder 20 of the removable cylinder shift pack 16, wherein the cylinder rod 20b of the second cylinder 20 moves upward in the direction toward the tool mounting 14.

The method can further include removing the removable cylinder shift pack 16 from the frame assembly 12 as described herein above. As also described herein above, at least one cylinder 18 and/or 20 of the removable cylinder shift pack 16 can be replaced with a substitute cylinder, such as substitute cylinder 20-1. After replacement, the removable cylinder shift pack 16 can be reinstalled into the frame assembly 12. Optionally, the method can include removing the cylinder shift pack 16 from the frame assembly 12, replacing the substitute cylinder 20-1 with the cylinder 20 and reinstalling the removable cylinder shift pack 16 into the frame assembly 12 and moving the tool mounting 14 relative to the frame assembly 12.

With additional reference to FIGS. 9-13, additional cylinder shift packs are shown. In particular, each of FIGS. 9-13 show a cylinder shift pack 16-1, 16-3, 16-4, 16-5, and 16-6 installed on the frame assembly 12. The various cylinder shift packs 16-2 through 16-6 can all include a common cylinder 18, though this is not required; however, each of the cylinder shift packs depicted can include a different second cylinder such as illustrated second cylinders 20-2, 20-3, 20-4, 20-5, and 20-6. Each of the substitute second cylinders 20-2 through 20-6 can have a varying stroke distance so that an overall distance by which the shift pack assembly can move the tool mounting 14 can vary. In particular, as shown, the total distance at which the shift packs can move the tool mounting relative to the base member 32 can be a distance D2, D4, D5, and D6 corresponding to the substitute second cylinder 20-2 through 20-6. By way of example, the distance at which the first cylinder 18 moves the tool mounting 14 can be 150 mm, whereas the distance that the substitute second cylinders 20-2 through 20-6 move the tool mounting 14 can be, respectively, 75 mm., 100 mm., 125 mm., 150 mm., and 175 mm., so that when both cylinders are fully extended, the distances D2-D6 can vary a corresponding amount. Of course, other distances could be used.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A multi-stage shift pack assembly, comprising:
a frame assembly including a first telescoping frame assembly and a second frame assembly laterally spaced from the first frame assembly, the second frame assembly being a separate and distinct component of the frame assembly from the first frame assembly;
a tool mounting movable relative to said frame assembly and interconnecting said first and second frame assemblies; and
a removable cylinder shift pack secured to said frame assembly and positioned between said first and second frame assemblies, said cylinder shift pack having at least two cylinders that are independently actuatable for moving said tool mounting relative to said frame assembly a desired amount;
wherein said at least two cylinders includes a first cylinder arranged to extend in a first direction away from said tool mounting upon actuation of said first cylinder and a second cylinder arranged to extend in a second direction toward said tool mounting upon actuation of said second cylinder, the first cylinder includes a first cylinder rod, the second cylinder includes a second cylinder rod; and
wherein a distal end of said second cylinder rod of said second cylinder is attached to said tool mounting with a mounting collar for abutment thereagainst, the mounting collar including a base plate secured to said tool mounting via fasteners.

2. The multi-stage shift pack assembly of claim 1 wherein the cylinder shift pack is removable from the frame assembly for substituting said second cylinder with a substitute second cylinder having a stroke length that is different than said second cylinder.

3. The multi-stage shift pack assembly of claim 2 wherein both the first and second cylinders are removable for substitution by a set of substitution cylinders, including said substitute second cylinder and a substitute first cylinder.

4. The multi-stage shift pack assembly of claim 1 wherein the frame assembly includes a base member to which a distal end of a first cylinder rod of said first cylinder is attached for abutment thereagainst.

5. The multi-stage shift pack assembly of claim 1 wherein a first cylinder housing of said first cylinder is secured to a second cylinder housing of said second cylinder.

6. The multi-stage shift pack assembly of claim 1 wherein each of said first cylinder and said second cylinder is a pneumatic cylinder having a cylinder housing such that the corresponding cylinder rod is extendable from and retractable within said cylinder housing.

7. The multi-stage shift pack assembly of claim 6 wherein each of said first cylinder and said second cylinder is a double acting cylinder.

8. The multi-stage shift pack assembly of claim 1 wherein the each of the first frame assembly and the second frame assembly includes:
a lower frame assembly;
a middle frame assembly slidably secured to said lower frame assembly for slidable movement in a vertical direction relative thereto; and
an upper frame assembly slidably secured to said middle frame assembly for slidable movement in the vertical direction relative thereto, said tool mounting fixedly secured to a distal upper end of said upper frame assembly,
wherein said first cylinder is arranged to move said middle frame assembly relative to said lower frame assembly upon actuation of said first cylinder and thereby to move said tool mounting relative to said lower frame assembly a first cylinder distance corresponding to said first cylinder, and said second cylinder is arranged to move said upper frame assembly relative to said middle frame assembly upon actuation of said second cylinder and thereby to move said tool mounting relative to a base member a second cylinder distance corresponding to said second cylinder.

9. The multi-stage shift pack assembly of claim 1 wherein said first cylinder has a first cylinder housing and said first cylinder rod is extendable from said first cylinder housing in a direction away from said tool mounting, and the second cylinder has a second cylinder housing and said second cylinder rod is extendable from said second cylinder housing in a direction toward said tool mounting, said first cylinder housing nonmovably secured to said second cylinder housing.

10. The multi-stage shift pack assembly of claim 9 wherein actuation of said first cylinder moves said first and second cylinder housings upward to move said tool mounting upward, and wherein actuation of said second cylinder moves said tool mounting upward.

11. A shift pack assembly for adjustably supporting a vehicle frame, comprising:
a frame assembly with a tool mounting movably supported thereby, the frame assembly including first and second telescoping frame members that extend upwardly, are separate and distinct from each other, and are spaced laterally apart from each other with said tool mounting fixably secured to and interconnecting the first and second frame members at a distal upper end of the frame assembly;
a first cylinder having a first cylinder housing secured to the frame assembly and a first cylinder rod, said first cylinder arranged between the first and second frame members such that said first cylinder rod extends downwardly relative to said first cylinder housing upon actuation thereof to raise the tool mounting; and
a second cylinder having a second cylinder housing secured to the frame assembly and a second cylinder rod, said second cylinder arranged between the first and second frame members such that said second cylinder rod extends upwardly relative to said second cylinder housing upon actuation thereof to raise the tool mounting,
wherein said first and second cylinders are independently actuatable relative to one another such that said tool mounting is movable a first cylinder stroke distance upon actuation of said first cylinder and/or is movable a second cylinder stroke distance upon actuation of said second cylinder.

12. The shift pack assembly of claim 11 wherein the first and second frame members are secured to and extend upward from a base member and said second cylinder is removable from the frame assembly and tool mounting with the first and second frame members secured to the base member and the tool mounting, and said second cylinder is replaceable with a substitute second cylinder for varying said second cylinder stroke distance.

13. The shift pack assembly of claim 12 wherein said first cylinder is removable together with said second cylinder.

14. A multi-stage shift pack method for adjustably supporting a vehicle frame, comprising:
providing a frame assembly including first and second telescoping frame members that are separate and distinct from each other and are secured to and extend upwardly from a base member, the first and second frame members being spaced laterally apart from each other, a tool mounting movable relative to said frame assembly with said tool mounting fixably secured to and interconnecting the first and second frame members at a distal upper end of the frame assembly, and a removable cylinder shift pack secured to said frame assembly and positioned between the first and second frame members; and
moving said tool mounting relative to said frame assembly by independently actuating cylinders of said removable cylinder shift pack.

15. The multi-stage shift pack method of claim 14 wherein moving said tool mounting relative to said frame assembly includes:
independently actuating a first cylinder of said removable cylinder shift pack, wherein a cylinder rod of said first cylinder moves downward in a direction away from said tool mounting.

16. The multi-stage shift pack method of claim 15 wherein moving said tool mounting relative to said frame assembly includes:
independently actuating a second cylinder of said removable cylinder shift pack, wherein a cylinder rod of said second cylinder moves upward in a direction toward said tool mounting.

17. The multi-stage shift pack method of claim 14 further including:
removing said removable cylinder shift pack from said frame assembly; and
replacing at least one cylinder of said removable cylinder shift pack with a substitute cylinder; and
reinstalling said removable cylinder shift pack into said frame assembly.

18. The multi-stage shift pack method of claim 17 further including:
removing said removable cylinder shift pack from said frame assembly; and
replacing said substitute cylinder with said at least one cylinder;
reinstalling said removable cylinder shift pack into said frame assembly; and
moving said tool mounting relative to said frame assembly.

19. The multi-stage shift pack assembly of claim 1 wherein the mounting collar includes flanges configured for securing the distal end of the second of the second cylinder rod.

* * * * *